(12) United States Patent
Abma et al.

(10) Patent No.: US 7,722,768 B2
(45) Date of Patent: May 25, 2010

(54) PROCESS FOR THE SIMULTANEOUS REMOVAL OF BOD AND PHOSPHATE FROM WASTE WATER

(75) Inventors: Wiebe Ruurd Abma, De Wilgen (NL); Sjoerd Hubertus Josef Vellinga, Tjalleberd (NL); Ronald Mulder, Balk (NL)

(73) Assignee: Paques B.V., Balk (NL)

( * ) Notice: Subject to any disclaimer, the term of this patent is extended or adjusted under 35 U.S.C. 154(b) by 459 days.

(21) Appl. No.: 11/662,160

(22) PCT Filed: Sep. 9, 2005

(86) PCT No.: PCT/NL2005/000654
§ 371 (c)(1),
(2), (4) Date: Mar. 7, 2007

(87) PCT Pub. No.: WO2006/028372
PCT Pub. Date: Mar. 16, 2006

(65) Prior Publication Data
US 2008/0073265 A1     Mar. 27, 2008

(30) Foreign Application Priority Data
Sep. 10, 2004     (EP) ................... 04077525

(51) Int. Cl.
*C02F 3/30* (2006.01)
(52) U.S. Cl. .............. 210/605; 210/623; 210/259; 210/903; 210/906
(58) Field of Classification Search .......... 210/605, 210/621, 623, 630, 252, 259, 903, 906; 435/262, 435/262.5
See application file for complete search history.

(56) References Cited

U.S. PATENT DOCUMENTS 3,980,556 A * 9/1976 Besik ..................... 210/616

(Continued)

FOREIGN PATENT DOCUMENTS

DE     3732896 A1     8/1988

(Continued)

OTHER PUBLICATIONS

E. V. Münch, K. Barr, Controlled Struvite Crystallisation for Removing Phosphorus From Anaerobic Digester Sidestreams, Wat. Res., 2001, pp. 151-159, vol. 35, No. 1, Elsevier Science Ltd., Great Britain.

(Continued)

*Primary Examiner*—Fred Prince
(74) *Attorney, Agent, or Firm*—The Webb Law Firm

(57) ABSTRACT

The invention is directed to a process for the simultaneous removal of BOD and phosphate from a liquid containing ammonium, BOD, phosphate and magnesium, the method comprising: feeding the liquid to a reactor containing BOD-oxidising biomass; ensuring that the liquid in the reactor contains an excess to stoichiometry of ammonium and magnesium relative to phosphate, wherein the stoichiometry is related to the stoichiometry of struvite; oxidising at least part of the BOD; adjusting the pH of the liquid in the reactor at a desired value; forming solid material in the reactor, the solid material comprising struvite; separating at least part of the solid material from the reactor effluent; returning a part of the solid material to the reactor. The invention is also directed to a reactor for this process. The advantage of the process and the apparatus is that in one reactor both BOD and phosphate are removed from the liquid.

15 Claims, 2 Drawing Sheets

U.S. PATENT DOCUMENTS

| | | |
|---|---|---|
| 5,126,049 A | 6/1992 | Hallberg |
| 5,593,590 A * | 1/1997 | Steyskal .................... 210/603 |
| 5,788,842 A | 8/1998 | Frisch |
| 6,706,521 B2 | 3/2004 | Frisch |
| 2002/0158009 A1 * | 10/2002 | Khudenko ................. 210/605 |
| 2003/0127379 A1 | 7/2003 | De Bruijn et al. |
| 2003/0201225 A1 * | 10/2003 | Josse et al. ................. 210/605 |

FOREIGN PATENT DOCUMENTS

| | | |
|---|---|---|
| EP | 0327184 A1 | 8/1989 |
| EP | 1496019 A1 | 1/2005 |
| WO | 98/07664 A1 | 2/1998 |
| WO | 01/66475 A1 | 9/2001 |
| WO | 03/086990 A1 | 10/2003 |

OTHER PUBLICATIONS

J. H. Hunik, J. Tramper, and R. H. Wijffels, A strategy to scale up nitrification processes with immobilized cells of nitrosomonas europaea and nitrobacter agilis, Bioprocess Engineering Publication, 1994, pp. 73-82, vol. 11, The Netherlands.

* cited by examiner

PROCESS FOR THE SIMULTANEOUS REMOVAL OF BOD AND PHOSPHATE FROM WASTE WATER

BACKGROUND OF THE INVENTION

1. Field of Invention

The present invention relates to a process for the simultaneous removal of BOD and phosphate from a liquid containing ammonium, BOD and phosphate and to an apparatus for use in such a process.

2. Description of Related Art

In municipal and industrial water applications phosphate-polluted wastewater is generated and phosphate removal techniques may be applied for the wastewater treatment. Conventional processes are based on the fixation in activated sludge or on the precipitation of phosphate as calcium or iron salt. The latter process generates huge amounts of a water-rich sludge, which has to be disposed of at continuously increasing costs. To minimise disposal costs, the sludge is often mechanically dewatered prior to disposal. Typically, even after dewatering, the water content of the sludge still amounts to 60% to 85% and a relatively large part of the disposal costs comes from the expensive disposal of water. Due to the high water content and the low quality of the waste sludge, reuse of phosphate is not an economically attractive option.

U.S. Pat. No. 5,126,049 describes a process for the treatment of raw water, comprising the biological denitrification of water in the presence of bacteria to produce a supply of water having a reduced nitrogen content and bacteria containing cell-bound nitrogen. The supply of water having reduced nitrogen content is aerated to release said cell-bound nitrogen in the form of ammonium ions (not nitrate or nitrite ions). The ammonium ions are precipitated in the form of struvite by treating the supply of water with magnesium ions and phosphate ions in a reactor to produce a substantially nitrogen free supply of water. In order to attain optimal conditions for the biological reaction, alcohol, sugar or organic acid is added as a carbon source for the bacteria. The precipitation preferably includes treating the water with magnesium and phosphate ions to precipitate the ammonium ions in the form of struvite ($MgNH_4PO_4$, MAP). This purification process requires at least four reactors and vessels: a denitrification reactor, an aeration vessel, a second reactor for the formation of struvite and a filtration or sedimentation vessel (tank).

EP1496019 (WO0308699) discloses a process and an apparatus for recovering magnesium ammonium phosphate as MAP crystals from wastewater containing high concentration organic substance, phosphorus and nitrogen such as a digested supernatant liquor of human waste sewage and septic tank sludge, a digested liquor of sludge and chemical plant wastewater. The sludge treatment process comprises treating a sludge mixed liquor formed in the biological treatment system for organic wastewater in an anaerobic digestion tank to effect the digestion of sludge, simultaneously adding a magnesium source to the anaerobic digestion tank to allow crystals particles of MAP to form and grow in the anaerobic digestion tank, withdrawing a sludge mixed liquor containing the crystals of MAP from the anaerobic digestion tank, separating and recovering solids containing MAP crystal particles from the withdrawn sludge mixed liquor, and returning part of the sludge mixed liquor after separation and recovery of MAP crystal particles to the anaerobic digestion tank.

Alternative processes may comprise the crystallisation of struvite, e.g. by using a suitable seed material like sand or minerals (Crystalactor® process) or by using granules ("Phosnix" process). In a process of the art, using a Crystalactor®, waste water is treated in an anaerobic biological reactor because of the low sludge production, the low energy consumption and the biogas production. The effluent is polished in an aerobic biological treatment plant. Phosphate is removed by struvite crystallization in a second reactor, by feeding $MgCl_2$ and NaOH solutions into a part of the effluent of the anaerobic stage. In the "Phosnix" process, another process of the art, waste water containing phosphate is fed into a reaction vessel where magnesium is dosed, the pH is controlled and fine MAP crystals are formed. In the bottom part of the reaction vessel, MAP granules fluidized by air are retained and fine MAP crystals stick on the surface of the granules growing their size. Grown up MAP granules are discharged periodically from bottom of the reaction vessel.

A disadvantage of the process and the apparatus of the prior art is that it only provides facilities to remove phosphate, but BOD (biological oxygen demand) is not removed or BOD and phosphate have to be removed in different reactors. Another disadvantage is that extra chemicals may be needed to control the pH.

SUMMARY OF THE INVENTION

Hence, it is an object of the invention to provide a process that partly or completely overcomes the above-mentioned disadvantages. According to the invention, there is provided a process for the simultaneous removal of BOD and phosphate from a liquid containing ammonium, BOD, phosphate and magnesium, the process comprising:
  a) feeding the liquid to a reactor containing BOD-oxidising biomass;
  b) ensuring that the liquid in the reactor contains an excess to stoichiometry of ammonium and magnesium relative to phosphate, wherein the stoichiometry is related to the stoichiometry of struvite;
  d) aerobically oxidising at least part of the BOD in the reactor;
  e) adjusting the pH of the liquid in the reactor at a value of 7.5-11;
  f) forming solid material in the reactor, the solid material comprising struvite;
  g) separating at least part of the solid material comprising struvite from the reactor effluent;
  h) returning a part of the solid material to the reactor; and
  i) maintaining a biomass retention time of the biomass in the reactor such that nitrification of ammonium in the reactor is 25% or below.

In another aspect, the invention is directed to an apparatus for the simultaneous removal of BOD and phosphate from a liquid, the apparatus comprising:
  a) a reactor, the reactor comprising:
    i) an inlet for the liquid;
    ii) an inlet and a distributor for an oxygen-containing gas;
    iii) an outlet for carbon dioxide-containing gas;
    iv) an outlet for a reactor effluent;
    v) optionally one or more means selected from the group consisting of means for measuring and/or means for controlling an ammonium concentration, a phosphate concentration, a magnesium concentration, an oxygen concentration, the temperature and the pH;
  b) a separator for separating solid material from the liquid in the reactor;
  c) a return line connecting the separator and the reactor for returning at least part of the solid material to the reactor.

The advantage of the process and the apparatus of the invention is that in one reactor both BOD and phosphate are removed from the liquid, in contrast to the prior art processes or apparatus. Another advantage of the process is that the use of base is reduced by stripping $CO_2$ from the liquid. Unlike e.g. EP1496919 the present invention advantageously provides the combination of aerobic oxidation of BOD and the formation of MAP in one reactor.

DETAILED DESCRIPTION OF THE INVENTION

Figure 1:
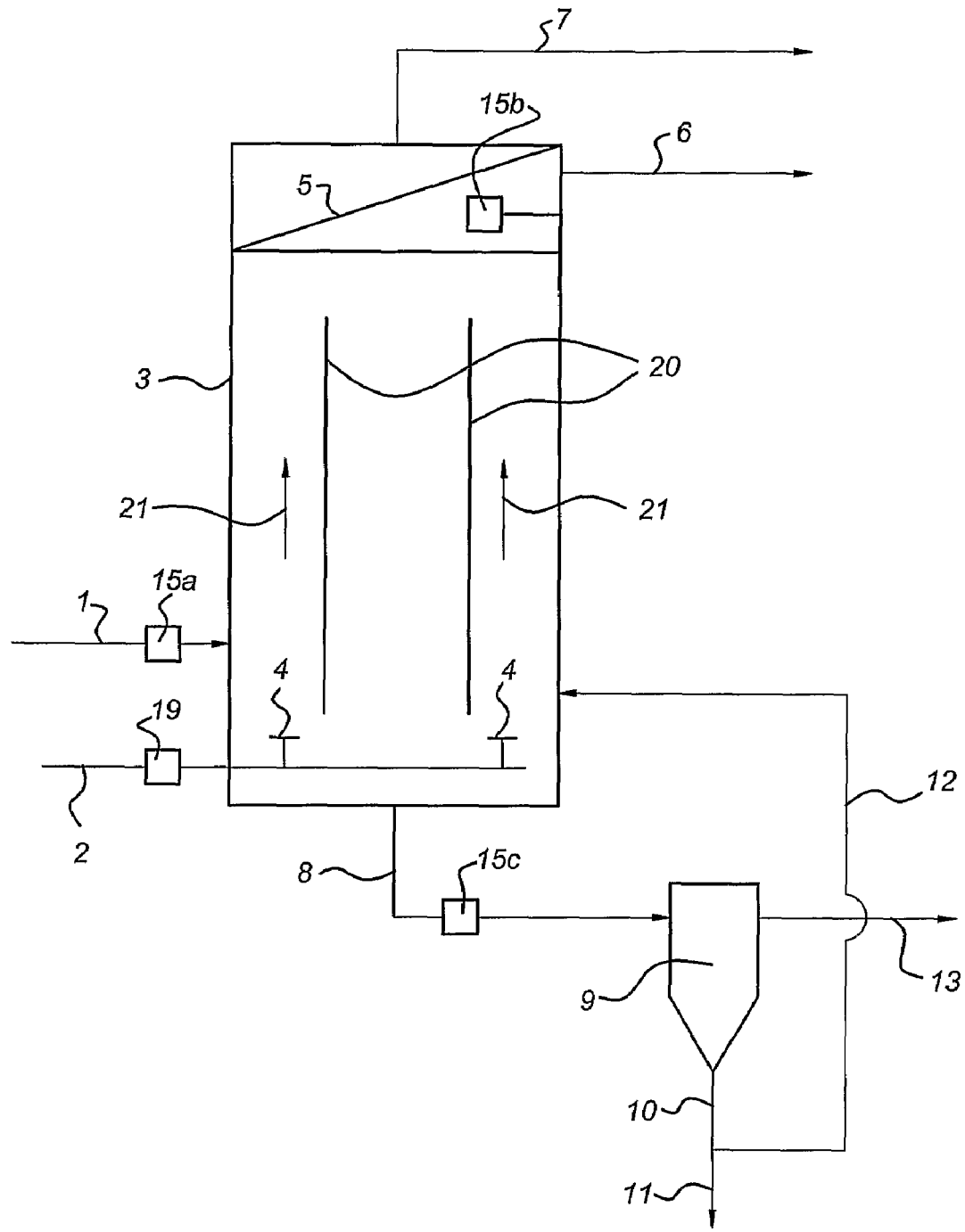
FIG. 1 schematically depicts an embodiment of the apparatus of the invention for performing the process of the invention.

The liquid which can be subjected to the process of the invention, e.g. in the apparatus of the invention, can e.g. be a municipal waste stream, like sewage, or a waste stream of a plant or an industrial effluent. Such waste streams may comprise as BOD e.g. proteins, fatty acids, etc., i.e. organic materials and/or reduced sulphur compounds like sulphide, that can be oxidised biologically. With respect to biological and chemical oxygen demand, terms known to the person skilled in the art: the chemical oxygen demand (COD) is the amount of oxygen required to oxidise oxidisable compounds of waste water like organic material but e.g. also sulphur. Biochemical Oxygen Demand (BOD) refers to the amount of oxygen that is consumed by bacteria (and protozoa) by oxidising organics (and other oxidisable material like e.g. S, if present) in water. Hence, COD comprises BOD and is larger than BOD. Methods to determine BOD and COD are known in the art (like e.g. a manometric determination of BOD with a BODTrak from Hach Lange). The liquid, e.g. a waste stream, will usually comprise water as liquid and as carrier of the BOD/COD. The liquid or liquid stream may also be obtained by admixing solid or liquid BOD to e.g. water. The liquid is fed as liquid stream to a reactor. By way of example, the liquid may comprise about 0.02-20 gram/l BOD, preferably 0.1-5 gram/l BOD, though the amount may also be larger or smaller, e.g. depending upon the kind of waste water. BOD that is not biologically oxidised in the reactor may be returned to the reactor in e.g. a liquid stream or may be treated with other techniques known to the person skilled in the art to further remove BOD.

The pH of the liquid, especially the pH of the liquid in the reactor can be adjusted to about 7.5-11 by stripping $CO_2$, if necessary with addition of bases (caustics). Preferably, no bases are added and the pH is adjusted and/or maintained by removing (stripping) $CO_2$. This stripping of $CO_2$ can be achieved by aerating the liquid before and/or in the reactor. For this purpose, the reactor may have one or more inlets for air and/or oxygen, like e.g. aerators, and also one or more outlets for a $CO_2$ comprising gas. At least part of the required pH increase is preferably accomplished by the stripping of $CO_2$ as a consequence of the aeration of the reactor, thereby diminishing the amount of chemicals needed to control the pH. If necessary, however, the pH can be further increased and controlled by adding alkaline materials, like e.g. NaOH, MgO, $Mg(OH)_2$, $Na_2CO_3$, etc. Preferably, the pH is adjusted by using e.g. MgO or $Mg(OH)_2$ or both. Preferably, the pH of the liquid in the reactor is between about 7.5 and 9.5, more preferably between about 8 and 9. Next to the effect of stripping $CO_2$ by providing air or oxygen, also oxygen is provided to the bacteria.

In an embodiment of the invention, a process is used wherein a biomass retention time is chosen such that BOD is at least partially oxidised. Preferably, BOD is substantially oxidised (in an embodiment at least 90 wt. %, preferably at least 95 wt. %). Further, the biomass retention time is preferably chosen such that the growth of species that oxidise ammonium is diminished. In this way, the ammonium is substantially not oxidised. Preferably, the sludge retention time (i.e. the biomass retention time) in the reactor is maintained lower than the doubling time of ammonium oxidising bacteria (nitrifying bacteria like Nitrosomonas Europaea, Nitrosomonas Oligotropha, Nitrosomonas Communis and Nitrobacter Agilis), for instance an SRT of about 18 h at a temperature of 35° C., or e.g. an SRT of about 35 h at about 20° C. For examples of nitrifying bacteria and their growth rates, see e.g. J. H. Hunik, J. Tramper, R. G. Wijffels, Bioprocess Engineering 11 (1994) 73-82, which is herein incorporated by reference. Preferably, the SRT is about 4-25 h at about 35° C., and about 4-40 h at about 20° C. In general, the SRT is about 4-25 h, preferably about 8-22 h. In an embodiment, also nitrification inhibitors (like e.g. dicyandiamide or dimethyl pyrazolphosphate) may be added to the liquid. The doubling time of ammonium oxidising bacteria in an effluent (of e.g. a digester) containing BOD, biomass, ammonium and phosphate, as used in the invention, is e.g. about 20 h at about 20° C. (this time will depend upon the type of ammonium oxidising bacteria present and can be seen as mean value). Amongst others, this doubling time depends upon the temperature. When selecting a sludge retention time less than this doubling time, even only a few minutes less, the preferred conditions of the invention are obtained, i.e. BOD is at least partially oxidised, but ammonium is substantially not oxidised, such that ammonium can be used to form struvite. In an embodiment of the invention, the sludge retention time (biomass retention time) is about 10-99% of the doubling time of the ammonium oxidising bacteria in the reactor (during the process of the invention), more preferably about 40-85% of the doubling time of the ammonium oxidising bacteria in the reactor. The doubling time of ammonium oxidising bacteria can be evaluated by methods known to the person skilled in the art.

In another preferred embodiment, the sludge retention time (i.e. the biomass retention time) in the reactor is maintained lower than the inverse of the growth rate (defined as 1/h) of the ammonium oxidising bacteria (nitrifying bacteria like Nitrosomonas Europaea, Nitrosomonas Oligotropha an Nitrosomonas Communis). In an embodiment of the invention, the sludge retention time (biomass retention time) is about 10-99% of the inverse of the growth rate of the ammonium oxidising bacteria in the reactor (during the process of the invention), more preferably about 40-85% of the inverse of the growth rate of the ammonium oxidising bacteria in the reactor. Growth rates (maximum specific growth rates) for a number of nitrifying bacteria are e.g. evaluated in S. H. Hunik, J. Tramper, R. G. Wijffels, Bioprocess Engineering 11 (1994) 73-82, which is herein incorporated by reference (e.g. the inverse growth rate of *N. europaea* is 146 h at 7° C.). Growth rates and doubling time of the ammonium oxidising bacteria can be evaluated from the mass balance (see below) or e.g. by batch tests, wherein biomass is removed from the reactor and subsequently aerated. From the rate in which nitrate and nitrite is formed, the growth rate can be determined.

As mentioned above, the biomass retention time is preferably chosen such that the growth of species that oxidise ammonium is diminished. In this way, the ammonium is substantially not oxidised. Hence, in a preferred embodiment, the biomass retention time (SRT) is chosen such that nitrification in the reactor (wherein BOD is at least partly oxidised by aerobic bacteria) is 25% (mol %) or below (i.e. $\leq$25%), preferably 5% or below. This means that 25% or below, preferably 5% or below of the ammonium fed into this reactor is converted to nitrate and nitrite in the reactor. In this way, ammonium is substantially not oxidised and nitrification bacteria do not accumulate. For adjusting the biomass retention time (or the extent of nitrification) a preferred way is to monitor the mass balance of ammonium, nitrate and nitrite.

This can be done with means known in the art (like e.g. the Cuvette test from Hach Lange). Above 25%, preferably above 10% and more preferably above 5% conversion the sludge retention time will be shortened such that the growth of species that oxidise ammonium is diminished and nitrification is maintained below 25% (or lower). Hence, according to an embodiment of the invention, there is provided a process comprising maintaining a biomass retention time of the biomass in the reactor such that nitrification of ammonium in the reactor is 25% or below. An advantage of "simply" using the mass balance, i.e. monitoring the formation of nitrate and/or nitrite, is that the requirement of nitrification of 25% or below, preferably 10% or below and more preferably 5% or below applies for all temperatures applied, whereas the values of doubling time or growth rate of the nitrification bacteria depend upon the temperature applied (see e.g. FIGS. 3a,b in J. H. Hunik, J. Tramper, R. G. Wijffels, Bioprocess Engineering 11 (1994) 73-82). In an embodiment, at least nitrite is monitored and in a further embodiment the formation of both nitrite and nitrate is monitored.

The oxygen concentration is preferably between about 0.1-10 mg/l, more preferably about 0.1-4 mg/l $O_2$. Since the BOD-oxidising biomass may also comprise oxidisers of ammonium (like e.g. Nitrosomonas etc.), the oxygen concentration may be chosen below about 2 mg/l $O_2$, more preferably below about 1 mg/l $O_2$ (which also depends upon the temperature) in order to suppress the growth of nitrifying bacteria. The oxygen concentration may be controlled by changing the air supply to the reactor or by reducing the oxygen content in the air by recycling the air over the reactor. To this end, the apparatus of the invention may further comprise a unit that recycles at least part of gas over the liquid in the reactor back to the reactor as oxygen-containing gas feed. The sludge retention time may be increased when choosing low $O_2$ concentrations.

For aerobically oxidising at least part of the BOD in the reactor, the liquid may contain BOD-oxidising biomass, or BOD-oxidising biomass can be added to the reactor, e.g. during the process or before starting the process of the invention. The biomass may be normal aerobic biomass, like e.g. bacteria, fungi, and protozoa, etc., as e.g. obtained from sludge (a consolidated mixture of solids and water, e.g. produced in a wastewater treatment plant, a municipal wastewater treatment plant, etc., as known to the person skilled in the art). The amount of BOD-oxidising biomass is preferably about 0.1 to 5 kilogram/m$^3$ in the reactor. The weight ratio of BOD to ammonium in the liquid of step a) may for example be between about 0.01 and 100, more preferably between about 0.1 and 10 (weight BOD/weight ammonium).

The liquid to be treated further comprises phosphate ($PO_4^{3-}$) and ammonium ($NH_4^+$). Characteristic waste streams containing BOD, phosphate and ammonium are e.g. effluents of digesters (digester plants) and anaerobic waste water treatment plants. Ammonium and/or phosphate may also be added to the liquid if one or both of them are not present in the liquid or the amount is not sufficient. In case magnesium (Mg) is not present in the liquid, or there is a deficiency of Mg in the liquid, also Mg may be added. The Mg source may comprise at least one of MgO, $MgCl_2$ and/or $Mg(OH)_2$, etc. Hence, in the context of the invention "feeding a liquid containing ammonium, BOD, phosphate and magnesium" implies that such a liquid is provided into the reactor, and comprises e.g. the situation that a liquid containing BOD, ammonium and phosphate is fed to a reactor, and biomass and magnesium are added to the liquid before entering the reactor and/or while being in the reactor, i.e. each individual component is added to the reactor such that a liquid containing biomass, BOD, phosphate, ammonium and magnesium is obtained, but one or more of these components may be added as separate feed(s) to the reactor; all components do not need to be contained in the liquid introduced to the reactor.

When performing the process of the invention, one ensures that the liquid contains an excess to stoichiometry of ammonium and magnesium relative to phosphate, wherein the stoichiometry is related to the stoichiometry of struvite ($MgNH_4PO_4$ (which may also contain crystal water: usually $MgNH_4PO_4.6H_2O$)). This may require measuring the concentrations of the respective species ($NH_4^+$, $PO_4^{3-}$ and Mg) and when necessary adding ammonium and/or magnesium in order to get the desired excess (an excess to stoichiometry with respect to struvite). The phrase "excess to stoichiometry of ammonium and magnesium relative to phosphate, wherein the stoichiometry is related to the stoichiometry of struvite" in this context means that depending upon the concentration of phosphate, or where applicable the concentration of phosphate and ammonium, depending upon the temperature and pH, and depending upon the desired (or required) phosphate concentration in the effluent, the amount of magnesium (magnesium available for the formation of struvite), or the amount of ammonium (ammonium available for the formation of struvite), and where applicable the amount of magnesium and ammonium, to be added to the liquid (before or in the reactor) is chosen such, that the formation of struvite is promoted and the desired phosphate concentration (lower than the influent to the reactor) in the effluent is obtained. Either magnesium or ammonium are in excess, but preferably, both magnesium and ammonium are in excess relative to phosphate with respect to the stoichiometry of these three species in struvite. The phrase "excess to stoichiometry of ammonium and magnesium relative to phosphate, wherein the stoichiometry is related to the stoichiometry of struvite" relates to the ammonium concentration of the influent to the reactor of the invention. The ammonium concentration in the reactor will be lower due to the formation of struvite and due to some nitrification.

Preferably, the excess magnesium is about 1.1-10 times the amount of phosphate (molar ratio's of Mg/$PO_4^{3-}$ of 1.1-10), more preferably 1.5-5. Further, preferably, the excess ammonium is about 1.1-100 times the amount of phosphate (molar ratio's), more preferably 5-50. For this purpose, the reactor and/or tubes or pipes to and from the reactor may comprise means for measuring the concentration of $NH_4^+$, $PO_4^{3-}$ and/or Mg and for measuring the pH, temperature and/or oxygen concentration. These means are known to the person skilled in the art. Ensuring that the liquid (in the reactor or in the influent) contains the necessary relative amounts of $NH_4^+$, $PO_4^{3-}$ and Mg, and if necessary also the amounts of biomass and BOD, suitable for performing the process of the invention, may also comprise an occasional or periodical estimation of the concentration, e.g. by taking samples.

In an embodiment of the invention, the liquid, like e.g. a waste stream of a digester, is a stream of water containing ammonium, BOD and phosphate, wherein usually ammonium is already present in an excess relative to phosphate (with respect to the stoichiometry of struvite). Such liquid may also contain magnesium. According to the invention, the process is performed such that it is ensured that the liquid in the reactor contains an excess of magnesium relative to the stoichiometry of struvite (i.e. a molar excess of magnesium relative to phosphate) by adding magnesium. Hence, it is ensured that the amount of magnesium present in the reactor is present in a molar excess to phosphate, which is to be removed as struvite.

By aerating the liquid, $CO_2$ is removed and the pH increases. As mentioned above, the pH is preferably increased and maintained between about 7.5 and 11, more preferably between about 8 and 9. Due to this pH rise or due to the pH value of the liquid in the reactor, solid material is formed in the reactor. This solid material comprises struvite, formed from $NH_4^+$, $PO_4^{3-}$ and Mg. However, suitable pH values also depend upon the temperature. The values of about 7.5 and 11, more preferably between about 8 and 9, are related to a process that is performed at room temperature, e.g. about 20° C. When higher temperatures are used e.g. at about 35° C., the pH value may be chosen higher, e.g. about 8.5 to 10 such that struvite is (efficiently) formed and the required phosphate concentration in the effluent is obtained (i.e. the maximum phosphate concentration that is allowed, e.g. because of environmental regulations, or otherwise desired)

With the process and apparatus of the invention, both BOD and phosphate (and ammonium) can be removed from e.g. a waste water stream in one reactor, in contrast to processes known from the art. The process utilises advantageously the phosphate and ammonium present in waste water streams, and by selecting a sludge retention time such that ammonium is substantially not oxidised, BOD and phosphate (and ammonium) can be (at least partially) removed in one reactor. In this way, a process is provided for the simultaneous removal of at least part of the BOD and phosphate, and also at least part of the ammonium present in the waste stream.

A part of the struvite thus formed in the reactor and a part of the biomass present in the reactor, leaves the reactor with an effluent stream. Subsequently, the process comprises a step of separating at least part of the solid material (comprising struvite) from the reactor effluent, followed by returning a part of the solid material to the reactor. This may be a continuous process. At least a part of the solid material, comprising biomass and struvite, is returned to the reactor, but preferably, the process of the invention further comprises a process wherein struvite is separated from biomass in the liquid effluent, and substantially only struvite is returned to the reactor. This may e.g. be done with a process and apparatus wherein the separation is performed with a three-way solid-solid-liquid separator. Preferred embodiments of the invention comprise a process and apparatus wherein this separation is performed with a hydrocyclone or lamella separator, and wherein the biomass (solid) and struvite (solid) are separated from each other and from the liquid effluent. Hydrocyclones and lamella separators are known in the art, and they are e.g. schematically described in US2003/0127379 (lamella separator), U.S. Pat. No. 6,706,521 (hydrocyclone) and U.S. Pat. No. 5,788,842 (hydrocyclone), respectively, which are incorporated herein by reference. An advantage of using a hydrocyclone or a lamella separator is that solid matter with a settling rate larger than about 0.5 m/h (e.g. flocky sludge), especially larger than about 5 m/h and even more especially larger than about 10 m/h can effectively be separated. A further advantage is that biomass can substantially be separated from struvite. Other means than these separators can also be used like filters, clarifiers, and return systems. Hence, the biomass retention time (SRT) may be controlled by one or more elements selected from the group consisting of lamella separators, filters, clarifiers, hydrocyclones and return systems. By controlling the return flow of the liquid (with sludge) over the lamella separators, filters, clarifiers, hydrocyclones, and/or return systems, the biomass retention time is controlled. For example, 50-90 wt. % of the biomass present in the effluent of the reactor may be returned to the reactor. This amount will e.g. depend upon the flow speed of the liquid through the reactor, the biomass retention time (sludge retention time), the oxygen concentration in the liquid, etc. Hence, in an embodiment of the apparatus of the invention, the separator for separating solid material from the liquid in the reactor comprises a separator downstream of the reactor for separating solid material from the reactor effluent.

In a preferred embodiment the liquid (containing BOD) and sludge in the reactor is mixed well. Mixing may be performed by means known in the art like e.g. agitators, etc., but preferably, mixing is performed by the introduction of a gas (preferably the oxygen-containing gas) into the reactor. Preferably, the energy introduced in the liquid in the reactor is between about 10 and 500 $W/m^3$, more preferably between about 20 and 400 $W/m^3$, even more preferably between about 50 and 250 $W/m^3$. To this end, in a preferred embodiment aeration means like spargers or membrane distributors, or other means to introduce a gas are arranged in the reactor and connected to a blower, pump or other means known to the person skilled in the art designed to introduce the gas in to the liquid in the reactor with an energy between about 10 and 500 $W/m^3$, more preferably between about 20 and 400 $W/m^3$, even more preferably between about 50 and 250 $W/m^3$. In an alternative embodiment agitators or stirrers, etc. are arranged in the reactor, driven by one or more engines; jet stirrers or rotary gas injectors are arranged in the reactor, driven by one or more engines and/or one or more blowers, pumps or other means known to the person skilled in the art designed to propel gas. Hence, in a preferred embodiment of the process and apparatus of the invention, means are arranged in the reactor designed to introduce a mixing energy of between about 10 and 500 $W/m^3$, more preferably between about 20 and 400 $W/m^3$, even more preferably between about 50 and 250 $W/m^3$. These means may be selected from one or more of the group consisting of agitators, stirrers, spargers and membrane distributors, and other means known to the person skilled in the art. Further, in an embodiment one or more of riser tubes, down corner tubes and baffles may be arranged in the reactor in order to promote mixing.

In another embodiment, a three-way solid-solid separator is present in the reactor. In this embodiment, reactor effluent is to be understood as effluent of the section of the reactor wherein BOD is at least partially oxidised and struvite is formed (i.e. steps a-f) of the process of the invention) which is fed to the section of the reactor comprising the separator.

As mentioned above, part of the solid material, but preferably substantially only struvite is returned to the reactor after being separated from the liquid in the separator. In this way, the crystal growth of the struvite crystals in the reactor is promoted and larger crystals may be obtained. When starting up, one may add struvite crystals or other seed material. During processing, one may e.g. keep the amount of struvite in the reactor above a certain level, e.g. above about 1 $kg/m^3$ (volume of the liquid in the reactor), preferably at least about 10 $kg/m^3$, e.g. about 10-50 $kg/m^3$. During operation, also part of the struvite may be obtained as product and is not returned to the reactor. This product can e.g. be used as a fertilizer and/or may be further processed e.g. to obtain the desired particle size. In a characteristic example, struvite will have a mean dwell time in the reactor of about 10-35 days, preferably between about 20-30 days (e.g. about 25 days).

The process and the apparatus of the invention may further advantageously be extended with additional processes and apparatus or reactors, which run e.g. in advance, parallel and/or subsequent to the process of the invention. For example, the apparatus may comprise an anaerobic reactor upstream of the reactor a) (wherein BOD is aerobically treated and struvite formed) for anaerobically treating BOD, i.e. the process may further comprise a step wherein the BOD is anaerobically treated prior to step a). This can e.g. be done with an UASB (upflow anaerobic sludge blanket) reactor or an IC (internal circulation) reactor. In this step (or reactor), biogas may be formed that can e.g. be used as fuel for gas motors or pumps, etc. (e.g. those of the apparatus of the invention itself).

Further, the process and apparatus of the invention may also comprise a step and a reactor, respectively, wherein ammonium from the reactor or from the reactor effluent and/or effluent gas (air or oxygen, and $CO_2$) from the reactor comprising ammonia are fed to another reactor for removing at least part of the ammonium by nitrification and/or denitrification. This can e.g. be done with a process utilising the Anammox bacteria, as e.g. described in WO9807664 and EP0327184, which are herein incorporated by reference. Hereto, the apparatus of the invention may comprise an aerobic reactor downstream of the separator b) and/or downstream from the reactor a) (wherein BOD is aerobically treated and struvite formed). In an embodiment of the process of the invention, ammonium is removed from the effluent after f) using nitrifying bacteria. This step may be applied when not all ammonium has been removed by the reaction forming struvite (step f of the process of the invention). In a specific embodiment of the process of the invention, ammonium is removed from the effluent after f) using nitrifying bacteria and/or denitrifying bacteria, e.g. using Anammox bacteria.

According to yet a further aspect of the invention, there is provided a process for the simultaneous removal of BOD and phosphate from a liquid containing ammonium, BOD, phosphate and magnesium, the method comprising: oxidising at least part of the BOD in the reactor by BOD-oxidising biomass; providing a pH of the liquid in the reactor and a Mg content of the liquid in the reactor such that struvite can be formed; separation at least part of the struvite thus formed from the liquid in the reactor or from the effluent from the reactor or from both the liquid in the reactor and the effluent from the reactor; and preferably returning a part of the solid material to the reactor.

According to yet a further aspect of the invention, there is provided a process for the removal of BOD from a liquid containing ammonium and BOD and optionally one or more selected from the group consisting of phosphate and magnesium, the process comprising: oxidising at least part of the BOD in the reactor by BOD-oxidising biomass and maintaining a sludge retention time in the reactor that is lower than the doubling time of nitrifying bacteria, or in a variant, such that nitrification of ammonium is $\leq 25\%$. For instance, an SRT of 16 h at a temperature of 20° C. may be applied. In a variation on this embodiment, there is provided a process for the removal of BOD from a liquid containing ammonium and BOD and optionally one or more selected from the group consisting of phosphate and magnesium, the process comprising: feeding the liquid to a reactor containing BOD-oxidising biomass; oxidising at least part of the BOD in the reactor; and maintaining a sludge retention time in the reactor that is lower than the doubling time of nitrifying bacteria, or in a variant, maintaining a sludge retention time in the reactor such that nitrification of ammonium is $\leq 25\%$.

The process and apparatus of the invention are further illustrated below in the embodiments.

EMBODIMENT 1

FIG. 1 schematically depicts an embodiment of the apparatus of the invention for performing the process of the invention. However, other configurations are possible. This apparatus is also schematically depicted in FIG. 2a (this FIG. 2a also schematically describes an embodiment of the process of the invention).

Through an inlet for the liquid containing BOD, ammonium, magnesium, phosphate and biomass, the liquid influent 1 is fed to reactor 3. Alternatively, one or more of BOD, ammonium, magnesium, phosphate and biomass may be fed separately to the reactor (not shown in FIG. 1), because one or more of them are not comprised in the liquid stream, or are not comprised in the liquid stream in the desired amount(s). For example, biomass may be added to liquid 1 but biomass may also be present in reactor 3 and/or added to reactor 3 during the process. Usually, the liquid influent will comprise BOD, ammonium and phosphate. Additional phosphate or ammonium may be added to liquid 1 before reactor 3 or directly in reactor 3. They may be added as solid materials or solved or dispersed in e.g. water. Magnesium may also be added to liquid 1 before reactor 3 or directly in reactor 3. The desired stoichiometry for forming struvite can be controlled in this way. Hence, the phrase "feeding the liquid to a reactor" does not necessarily imply that the liquid 1 before being fed to reactor 3 comprises all necessary compounds, but implies that the liquid in reactor 3 comprises all necessary compounds, i.e. BOD, ammonium, magnesium, phosphate and biomass.

Reference symbols 4 schematically depict the inlets for air or $O_2$ (inlets and distributors for the oxygen-containing gas) for dispersing the gas into the liquid e.g. spargers, membrane distributors etc. which is fed to reactor 3 by line 2.

The reactor 3 may be of conventional type, like e.g. a fluidized bed reactor, a gas lift reactor, etc. The biomass may be present on granules, on biofilms or other carriers, as known to the person skilled in the art. The biomass may also be present as free cells or flocks, known to the person skilled in the art. Biomass is for example obtainable from sewage plants.

As known to the person skilled in the art, to obtain biomass in reactor 3 the liquid in reactor 3 may be inoculated with sludge from e.g. a sewage plant. Then, biomass starts growing and an equilibrium may be obtained between growth and discharge of biomass in reactor 3.

The reactor 3 of FIG. 1 may comprise a section 5 where part of the effluent may optionally leave reactor 1 via line 6, e.g. to be fed via line 6 to e.g. a reactor 25 (schematically shown in FIG. 2b), wherein e.g. ammonium is removed from the effluent after by using nitrifying/denitrifying bacteria. This may e.g. a reactor (or reactors) wherein anammox bacteria are used, like in the Anammox process, but reactor 25 may also comprise a reactor, or reactors, wherein the Anammox and Sharon process are performed, or wherein the Canon process is performed. Part or all of the gasses in reactor 3 may leave reactor 3 via an outlet for a carbon dioxide-containing gas, leaving by line 7. This gas may for example be air (used for stripping $CO_2$ from the liquid), further containing ammonia. In an embodiment, the gas containing $CO_2$ and ammonia may leave reactor 3, and may further via line 7 partly or completely also be fed to reactor 25. Reactor 25 is optional.

Part of the liquid effluent from reactor 3, or all effluent (when e.g. no effluent leaves via line 7 to e.g. reactor 25), may leave via an outlet of reactor 8 as liquid effluent, which is fed via line 8 to a separator 9. This separator 9 may be a three-way solid-solid-liquid separator 9, such that biomass can be separated from struvite, formed within the reactor 3 when the process of the invention runs. Struvite when separated may be partially or completely removed from separator 9 via line 10 to provide a struvite product 11 (which may further be processed when necessary or desired, e.g. drying etc.). However, preferably, part of the struvite is returned to the reactor 3 via line 12 (a return line connecting the separator and the reactor for returning at least part of the solid material to the reactor). Part of the biomass may be removed from reactor 3 and separated from the liquid effluent by separator 9 and be removed from separator 9 via line 13. Preferably, the biomass or sludge retention time in reactor 3 is less than about a day, but at least smaller than the doubling time of the nitrifying bacteria, which are also present in the biomass. In general, de doubling time of nitrifying bacteria (nitrification of ammonium) is equal to ln(2)/growth rate of the bacteria.

Figure 2A:
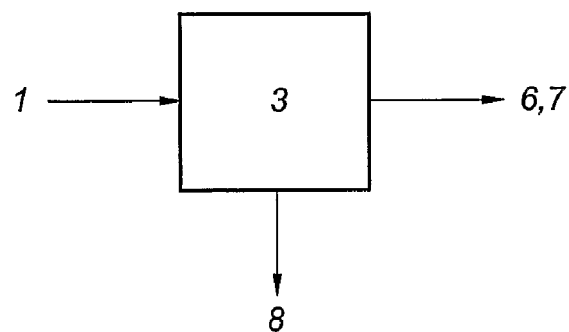
FIGS. 2a and 2b schematically depict embodiments of the apparatus and process of the invention with possible additional reactors.
Figure 2B:
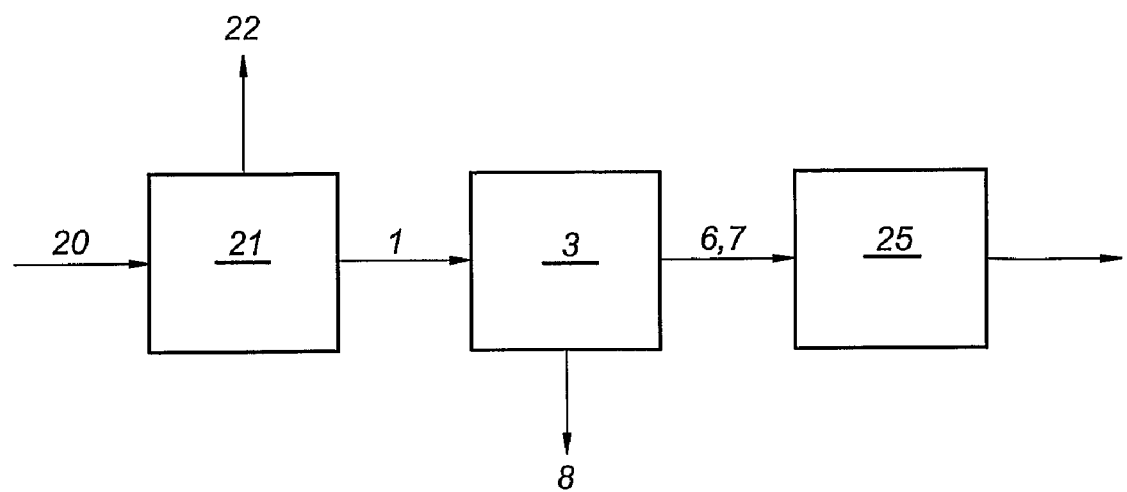

The apparatus of the invention as schematically depicted in FIG. 1 or in FIGS. 2a and 2b, may optionally comprise means for measuring and/or means for controlling an ammonium concentration, a phosphate concentration, a magnesium concentration, biomass, BOD and/or BOD concentration or amount, pH value, temperature, pressure, etc.

EMBODIMENT 2

FIG. 2a schematically depicts the apparatus and process of the invention (as described in embodiment 1) and FIG. 2b schematically depicts an embodiment with possible additional reactors or process steps, which are further described below.

For example, the apparatus of embodiment 1 may further comprise a reactor 21, wherein liquid stream 20 (containing BOD that can be treated anaerobically and aerobically) is anaerobically treated in reactor 21 such that a liquid stream 1 is provided (containing less BOD than before the treatment in reactor 21) and biogas or methane 22. Liquid stream 20 may be the same as liquid stream 1 of embodiment 1. Liquid stream 20 now further proceeds as liquid stream 1 to reactor 3 (see further embodiment 1). Part of the liquid effluent from reactor 3 may be fed via line 6 to a reactor 25 (e.g. a Canon, see above). Further, part of ammonia containing gasses from reactor 3 may be fed via line 7 to reactor 25. Here, ammonium is treated such that $N_2$ is formed. $CO_2$ from reactor 3 can also be degassed.

EMBODIMENT 3

This embodiment describes a combination of a digester plant and the reactor of the invention. A digester plant for digesting biological materials provides a waste water stream, containing BOD, ammonium and phosphate. The waste water stream is fed to the reactor of the invention and the process of the invention is applied, e.g. as continuous process. BOD, ammonium and phosphate are at least partially removed. Part of the remaining ammonium (after the process of the invention) may also be removed in a subsequent reaction with anammox bacteria (e.g. Anammox, Canon).

EMBODIMENT 4

In this embodiment, organic waste containing about 200 g/l COD (of which 190 g/l is biological degradable COD), 2 g/l P and 18 g/l N is treated in combination with a digester, a reactor for the removal of phosphate and BOD according to the invention and a nitrogen removal reactor comprising the Anammox conversion and a recycle.

The influent to the digester is diluted about 7 times, resulting in a COD amount of about 30 g/l COD. Dilution of the influent is done with an effluent recycle of the effluent of the Anammox reactor (e.g. reactor 25 in FIG. 2b). The effluent of the digester contains about 3 g/l COD (organic waste has been digested, e.g. to biogas), 0.3 g/l P and 2.5 g/l N. The temperature is about 30° C. and the pH is about 7.5. In the reactor of the invention, the pH is increased to about 8.3. The water containing the waste in the reactor of the invention has a Mg content of about 0.4 g/l, which is sufficient to remove P over 90% by forming struvite, which in this case does not require Mg addition (reactor 3 contains 0.4 g/l Mg, 2.5 g/l $NH_4$, and 0.3 g/l P, i.e. $Mg^{2+}:NH_4^+:PO_4^{3-}=1.7:18:1$). Struvite ($Mg^{2+}:NH_4^+:PO_4^{3-}=1:1:1$) is formed in the reactor and BOD is substantially removed (at least 95 wt. %). The reactor has a biomass content of about 5 g/l and a struvite content of 100 g/l. An SRT of about 16 h at a temperature of 30° C. was applied. BOD and COD contents are measured according to methods known to the person skilled in the art. Different methods may provide different absolute results, but the order of magnitude is usually the same.

EMBODIMENT 5

Referring to FIG. 1, reactor 3 of the apparatus of the invention may further comprise one or more of the group consisting of agitators, stirrers, spargers, and aeration means, and other means known to the person skilled in the art for mixing the liquid in reactor 3. FIG. 1 shows an embodiment with inlets 4 for air or $O_2$ (inlets and distributors for the oxygen-containing gas) for dispersing the gas into the liquid e.g. spargers, membrane distributors etc. which is fed to reactor 3 by line 2. Further, preferably optional down corner or riser tubes are present. The schematic drawing of FIG. 1 depicts one down corner tube 20 (reference numbers 20 in fact indicate the circumferential wall of such a tube 20). Of course, more than one of such tubes may be present. Due to the introduction of gas (e.g. air) via e.g. spargers 4, liquid enriched with gas rises, as indicated with reference symbols 21, and liquid flows down within the down corner tube 20. When alternatively gas would be introduced under the opening of tube 20, this tube would be indicated with a riser tube. In yet a further preferred variant, reactor 3 comprises tubes 20 and means 40 arranged such that reactor 3 comprises riser and down corner tubes. The tube(s) 20 are arranged such, that under operation conditions, the surface of the liquid is above the top opening of the tubes 20. Preferably, reactor 3 comprises a number of riser and/or down corner tubes. The ratio riser/downer area in reactor 3 is preferably between about 1:10 and 10:1, more preferably between about 1:5 and 5:1, even more preferably between about 2:1 and 1:2, e.g. 1:1.

In a preferred variant, the reactor has a volume of about 2-100 $m^3$, and down corner and/or riser tubes with a length of 30-80% of the height of the column of liquid in the reactor during operation conditions. In a variant, the internal height of reactor is about 2-10 m, and the column of liquid during operation is about 80-100% of this height.

EMBODIMENT 6

Means can be arranged in the reactor designed to introduce a mixing energy of between about 10 and 500 W/m$^3$, more preferably between about 20 and 400 W/m$^3$, even more preferably between about 50 and 250 W/m$^3$. By introducing this energy, the liquid with biomass are mixed will and a good dispersion of struvite in the liquid is obtained. These means may be selected from one or more of the group consisting of agitators, stirrers, spargers, and membrane distributors, and other aeration means known to the person skilled in the art. Referring to FIG. 1 and e.g. embodiment 5, these means may be e.g. spargers 4, introducing gas (preferably air) from line 2 with pump or blower 19 into reactor 3. Blower or pump 19 and means 4 are designed and arranged to introduce the above mentioned mixing energy.

EMBODIMENT 7

Referring to FIG. 1, means 15a and means 15b and/or 15c may be arranged within influent line 1, reactor 3, and effluent line 8, respectively. These means may comprises liquid samplers like e.g. taps for sampling liquid e.g. to estimate on line or off line one or more selected of the group consisting of ammonium, nitrate and nitrite concentration or may comprise devices for estimating on line one or more selected of the group consisting of ammonium, nitrate and nitrite concentration. In this way, the mass balance may be estimated and controlled, thereby enabling the operator or software to steer the process such that a biomass retention time is maintained such that nitrification of ammonium in the reactor is 25% or below, or maintaining a biomass retention time that is lower than the doubling time of nitrifying bacteria, or maintaining the sludge retention time (biomass retention time) about 10-99% of the doubling time of the ammonium oxidising bacteria in the reactor, depending upon the desired conditions.

EMBODIMENT 8

Assuming an effluent 8 from reactor 3 with about 50 g/l struvite and about 2 g/l biomass, substantially all struvite may be returned via e.g. line 12 to reactor 3 and about 50-90% of the 2 g/l biomass may be returned to reactor 3. The mean dwell time of the struvite in reactor 3 may about 25 days and the mean dwell time of the biomass may be about 0.5-1 day.

The embodiments described above and as schematically depicted in the drawings are not on scale. Further, only those parts of the apparatus relevant for the invention are depicted and described. The person skilled in the art will understand that there may be additional lines, pipes, taps, additional reactors, means for measuring and/or controlling concentrations of species and means for measuring and/or controlling the temperature, pressure, flow of gases and liquids and pH at one or more places in the apparatus, pumps, inlets, outlets, means for storage of materials like magnesium compounds, etc. The scope of protection of the invention is not limited to the embodiments given. The invention resides in each novel characteristic and each combination of characteristics. Reference numerals in the claims do not limit the scope of protection thereof. The use of the verb "comprise" and its declinations does not exclude the presence of elements other than those specified in the claims. The use of the indefinite article "a" or "an" preceding an element does not exclude the presence of a plurality of such elements.

The invention claimed is:

1. A process for the simultaneous removal of biochemical oxygen demand (BOD) and phosphate from a liquid containing ammonium, BOD, phosphate and magnesium, the process comprising:
   a) feeding the liquid to a reactor containing a BOD-oxidising biomass;
   b) ensuring that the liquid in the reactor contains an excess to stoichiometry of ammonium and magnesium relative to phosphate, wherein the stoichiometry is related to the stoichiometry of struvite;
   d) aerobically oxidising at least part of the BOD in the reactor;
   e) adjusting the pH of the liquid in the reactor to a value of 7.5-11;
   f) forming solid material in the reactor to form reactor effluent which exits from said reactor, the solid material comprising struvite;
   g) separating at least part of the solid material from the reactor effluent;
   h) returning a part of the solid material to the reactor; and
   i) maintaining a biomass retention time of the biomass in the reactor such that nitrification of ammonium in the reactor is 25% or below.

2. The process according to claim 1, further comprising maintaining a biomass retention time that is lower than the doubling time of nitrifying bacteria.

3. The process according to claim 1, comprising adjusting the pH of the liquid in the reactor by removing $CO_2$.

4. The process according to claim 1, wherein the pH is adjusted between 8 and 9.

5. The process according to claim 1, wherein a biomass retention time (SRT) is chosen between 4-40 hours.

6. The process according to claim 1, wherein the biomass retention time is controlled by one or more elements selected from the group consisting of lamella separators, filters, clarifiers, hydrocyclones and return systems.

7. The process according to claim 1, wherein struvite is separated from biomass in the liquid effluent.

8. The process according to claim 7, wherein the separation is performed with a three-way solid-solid-liquid separator.

9. The process according to claim 7, wherein the separation is performed with a hydrocyclone or lamella separator.

10. The process according to claim 1, wherein the struvite content in the liquid in the reactor is kept at least 5 kg/m$^3$.

11. The process according to claim 1, wherein ammonium is removed from the effluent after f) using nitrifying and/or denitrifying bacteria.

12. The process according to claim 1, wherein the BOD is anaerobically treated prior to step a).

13. An apparatus for the simultaneous removal of biochemical oxygen demand (BOD) and phosphate from a liquid, the apparatus comprising:
   a) a reactor, the reactor comprising:
      i) an inlet for the liquid;
      ii) an inlet and a distributor for an oxygen-containing gas;
      iii) an outlet for carbon dioxide-containing gas;
      iv) an outlet for a reactor effluent;
      v) optionally one or more means selected from the group consisting of means for measuring and/or means for controlling an ammonium concentration, a phosphate concentration, a magnesium concentration, an oxygen concentration, the temperature and the pH;

vi) one or more means selected from the group consisting of agitators, stirrers, spargers and membrane distributors, wherein the means are designed to introduce a mixing energy of between 10 and 500 W/m$^3$ into the liquid in the reactor;

b) a separator for separating solid material from the liquid in the reactor; and c) a return line connecting the separator and the reactor for returning at least part of the solid material to the reactor, wherein the separator is a three-way solid-solid-liquid separator.

14. The apparatus according to claim 13, further comprising an aerobic reactor downstream of the reactor a) for oxidising ammonia.

15. The apparatus according to claim 13, further comprising an anaerobic reactor upstream of reactor a) for anaerobically treating BOD.

* * * * *